July 15, 1969   H. E. PHELPS ET AL   3,455,283
FUEL FEEDING SYSTEM

Filed Sept. 1, 1966   3 Sheets-Sheet 1

INVENTORS
HAROLD E. PHELPS
HOWARD B. DICKIE
WILSON, SETTLE, BATCHELDER
ATT'YS.   & CRAIG.

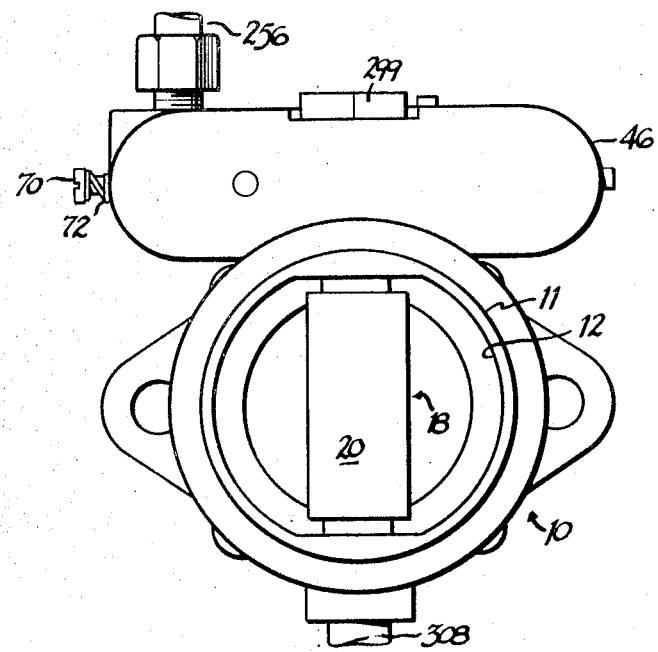
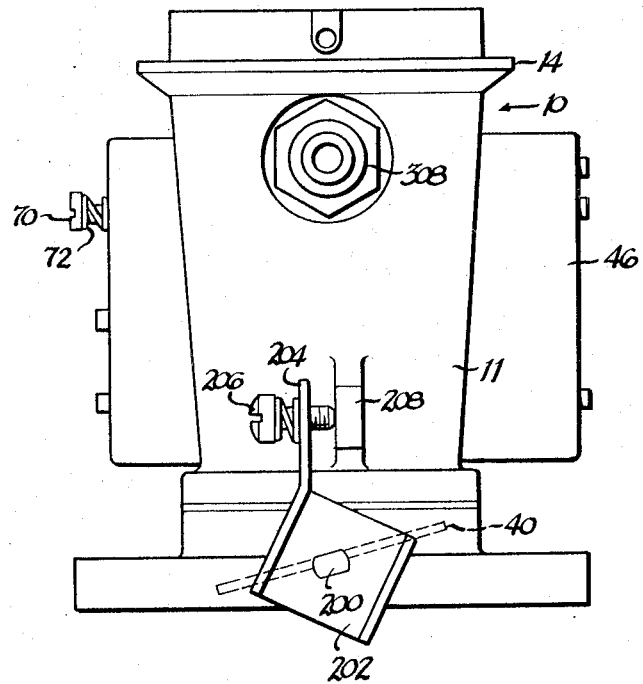

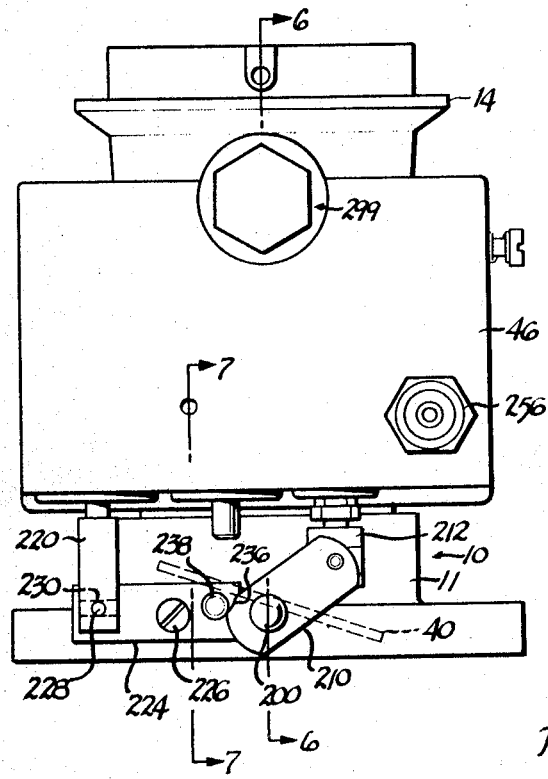
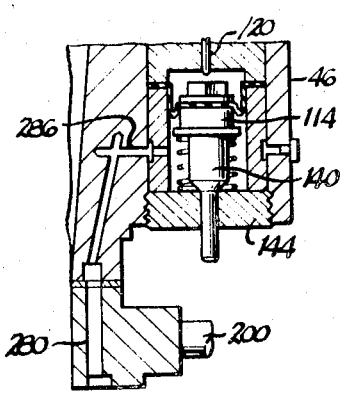
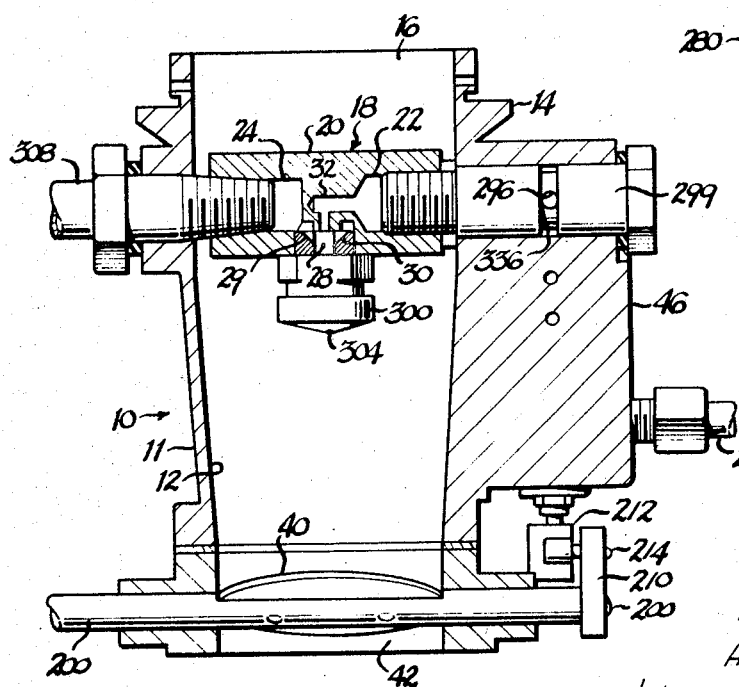

3,455,283
FUEL FEEDING SYSTEM
Harold E. Phelps, Plymouth, and Howard B. Dickie, Nankin, Mich., assignors to Harold Phelps, Inc., Plymouth, Mich., a corporation of Michigan
Filed Sept. 1, 1966, Ser. No. 576,673
Int. Cl. F02m 7/22, 25/06
U.S. Cl. 123—119     3 Claims

ABSTRACT OF THE DISCLOSURE

A carburetor having a fogging nozzle to which the flow of fuel is controlled by a fuel metering valve and compensating arrangement to regulate the rate at which fuel is delivered to the nozzle in synchronism with the main butterfly control valve. Exhaust gases are mixed with the fuel in the nozzle. In order to provide a proper mixture for all conditions of starting and operation, the compensating arrangement is operated under the control of the vacuum in the intake manifold to provide a precise and exact control of the flow of fuel and mixture to the engine in accordance with the requirements of the engine under varying operating conditions.

---

Various carburetors at the present time have been developed to the point where they are fitted with automatic chokes, weather compensated, four barrels, acceleration pumps and the like. The result is that some of the larger carburetors used today with their float chambers, complex metering valves, orifices, needle floats, and others, is that they are expensive to make and consume considerable fuel.

A summary of the foregoing is that carburetors in use today, although they have performed very well for many years on millions of vehicles, have drawbacks of complexity, high fuel consumption, high costs and problems of adjustment for optimum operation.

Accordingly, a substantial advance is the provision of a carburetor for internal combustion engines of the automotive type which is characterized by simple construction, economy of manufacture and operation, with undiminished performance, and other advantages as will become apparent in the following disclosure.

It is an object of the invention to provide a carburetor for an internal combustion engine of the automotive type that produces a uniform fuel mixture adequate to the needs of the automobile under all conditions of operation for improved economy without sacrifice of performance and by never injecting raw fuel into the intake manifold, either for acceleration or for starting.

More specifically it is an object of the invention to provide a carburetor wherein a valve is positioned in a housing between the inlet and outlet thereof for controlling the flow of fluid therethrough and a nozzle is provided for delivering fluid to the valve with a variable arrangement delivering liquid to the nozzle and a compensating arrangement for delivering additional liquid to the nozzle as the variable arrangement increases its delivery of liquid to the nozzle.

Another object of the invention is to provide a carburetor wherein a variable arrangement is utilized to control the flow of liquid therein and a compensating arrangement supplies additional liquid upon an increase of liquid flow under the control of the variable arrangement.

Other objects of this invention will appear in the following description and appended claims, reference being had to the accompanying drawings forming a part of this specification wherein like reference characters designate corresponding parts in the several views.

In the drawings:

FIGURE 3 is a top plan view of the carburetor embodying features of the invention;

FIGURE 4 is an end view in elevation of the carburetor embodying features of the invention;

FIGURE 5 is an end view in elevation of the carburetor embodying features of the invention and taken from the opposite end of that shown in FIGURE 4;

FIGURE 6 is a view taken along the line 6—6 of FIGURE 5 in the direction of the arrows; and FIGURE 7 is a fragmentary view taken along the line 7—7 of FIGURE 5 in the direction of the arrows.

Figure 2:
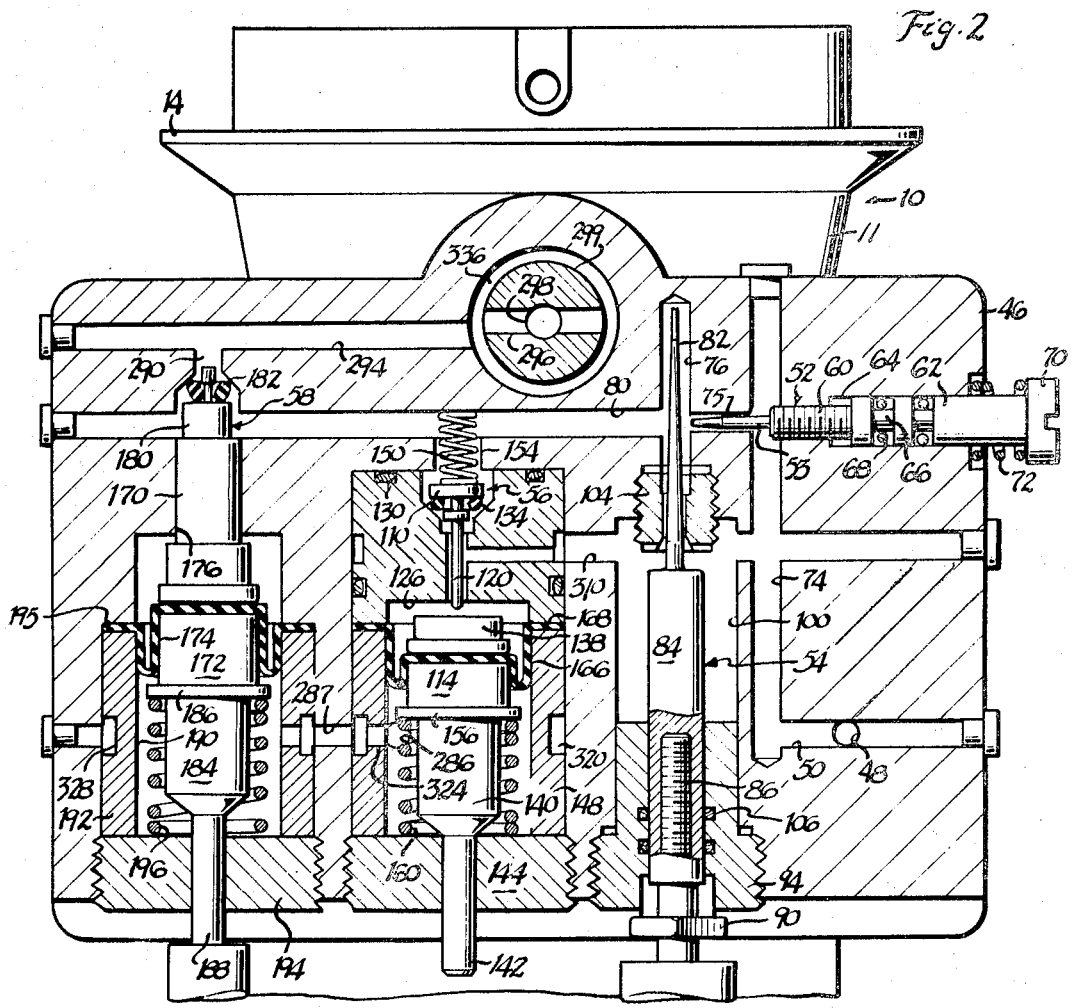
FIGURE 2 is a view in cross section taken along the line 2—2 of FIGURE 1 in the direction of the arrows.
Figure 1:
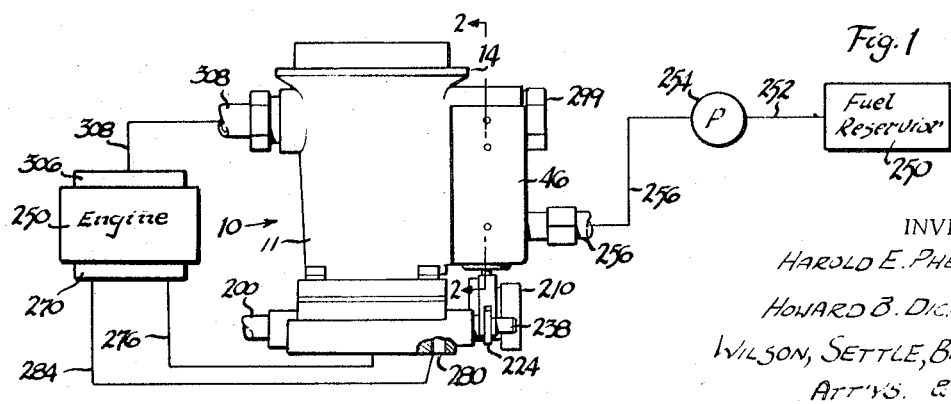
FIGURE 1 is a side view in elevation of a carburetor embodying features of the invention and showing diagrammatically a fuel reservoir, fuel pump, delivery line, an engine and connecting lines with all lines leading to the carburetor.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings the numeral 10 designates in general the improved carburetor. The carburetor 10 includes a housing 11 having a barrel 12 and is provided with a flange 14 at the top thereof for attachment of a suitable filter (not shown). Atmospheric air enters the barrel at the inlet top 16 thereof and is referred to as secondary air. Below the inlet top 16 there is attached a fogging nozzle 18. The fogging nozzle 18 (see FIGURE 6) includes a body portion 20 having an inlet 22 for fuel at one end and an inlet 24 for air or other gaseous fluid at the opposite end thereof. The inlet 22 leads to a vertical fuel passage 28 in open communication therewith and formed in the body portion 20. An insert 29 having a concave surface 30 surrounds the body portion which forms the passage 28 in spaced relation thereto and is in open communication with the inlet 24 of nozzle 18 by passage 32. The air or gaseous fluid that enters the inlet is referred to as primary air.

With further reference to FIGURE 6 a butterfly valve 40 is positioned in the barrel 12 immediately below the nozzle 18 and above the bottom outlet 42.

The housing includes an end control portion 46 at one end thereof (see FIGURE 2) which encloses a fuel inlet 48, a horizontal inlet passage 50, an adjusting needle valve 52, a variable needle valve 54 which operates in unison with the butterfly valve 40, a compensating valve 56 and a shut-off valve 58.

With further reference to FIGURE 2 the adjusting needle valve 52 includes a tapered valve proper 53, an adjustable screw 60 having a body portion 62 located in a bore 64 having reduced portions 66 surrounded by O-rings 68 to seal the body portion in the bore 64 to prevent the escape of fuel. The body portion 62 includes a slotted head 70 for receiving a suitable tool for adjusting the valve. A spring 72 is coiled around the body portion 62 positioned between the head 70 and the housing portion 46. The screw 60 is threaded in the portion 46 and the spring 72 holds the screw against rotation after it is once set. The adjusting needle valve 52 is used for fuel idling adjustment. The valve 52 controls the flow of fuel from the inlet passage 50, a vertical fuel passage 74, through passage 75, and into a vertical passage 76 and horizontal passage 80 which leads to other passages which lead to the carburetor nozzle 18. The other passages are hereinafter described in connection with valves 56 and 58 and nozzle 18.

The variable needle valve 54 includes a tapered valve proper 82, a body portion 84, a screw 86 positioned in the body portion 84, a nut 90 on the screw 86 to lock the screw in position. A plug 94 is screw threaded in the body portion 46 of the housing and partially surrounds the body portion 84 of valve 54 and nut 90. The plug 94 extends into a cavity 100 in housing portion 46. A plug 104 is positioned in the housing 46 at the upper end of the cavity 100 and surrounds a portion of the valve proper 82 in spaced relation thereto and the other part of the valve proper extends into the vertical passage 76. O-rings 106 surround the body portion 84 of valve 54 to prevent leakage between the body portion 84 of valve 54 and plug 94.

The compensating valve 56 is made up of two parts, one of which is the valve proper 110 and a part 114. The valve proper 110 is nested in cavity 116 in an insert 118 in housing portion 46. The valve proper 56 includes a depending push rod 120 which extends downwardly into a cavity 126 in the insert 118. The insert 118 is sealed by O-rings 130. An O-ring 134 is positioned below the valve proper 110 and surrounds the push rod 120. The part 114 includes a head portion 138, and a main body portion 140. The main body portion includes a depending guide portion 142 which is positioned in slidable relation with a plug 144 screw threaded in housing portion 46. The part 114 of the compensating valve 56 is positioned in a cavity 146 in an insert 148 in housing part 46. A coiled helical spring 150 is positioned on the upper part of valve proper 110 and extends through a passage 154 into passage 80 in engagement with the housing portion 46. The part 114 of valve 56 includes a flange 156 which surrounds the main body portion 140. A coiled helical spring 160 surrounds the body portion 140 and bears against the flange 156 on its upper end and against the plug 144 on its lower end. A resilient circular diaphragm 166 of the Bel-O-Fram type is positioned between the head 138 and the main body portion 140 to seal the space between the valve proper 110 and the cavity 146. The elge 168 of the diaphragm 166 is rigidly sealed between inserts 118 and 148.

The shut-off valve 58 includes an upper part 170 and a lower part 172 connected by a resilient circular diaphragm 174 of the Bel-O-Fram type. The upper part 170 is slidably positioned in a bore 176 in housing portion 46 and includes a valve proper 180 which extends through passage 80 into the upper end of bore 176. An O-ring 182 surrounds the upper end of valve 58. The lower part 172 includes a body portion 184 having a flange 186 and is positioned in a cavity 190 in an insert 192 in housing portion 46. The body portion 184 includes a depending actuating rod 188 slidably positioned in a plug 194 screw threaded in housing 46. The resilient diaphragm 174 has its edge 195 sealed between the housing portion 46 and the upper end of insert 192 to prevent leakage between the upper and lower portions of valve 58. A coiled helical spring 196 surrounds the body portion 184 of valve 58 in cavity 190 and has its upper end bearing against flange 186 of portion 184 and its lower end bearing against the plug 194.

The butterfly valve 40 is mounted on a rotatable shaft 200 which is transversely journalled in the lower part of housing 11. On one end of the shaft 200 there is secured a plate 202 movable upon rotation of shaft 200 and having an arm 204 having a set screw 206 extending therethrough to engage a stop 208 formed on the housing 11 to adjust the idling position of the butterfly valve. On the other end of the shaft 200 is an operating arm 210 which is connected to a member 212 of valve 54 and which is connected thereto by screw 86. The arm 210 is connected to member 212 by a pin 214 which extends into a slot 216 in member 212 to provide a slip connection between the arm 210 and member 212. Thus by rotating the shaft 200 the butterfly valve 40 will be rotated to open or closed position and the variable metering valve 54 moved to open or closed position. Thus the butterfly valve 40 and the valve 54 operate in unison.

Connected to the lower part of actuating rod 188 of valve 58 is a member 220. A pivotally mounted plate 224 pivoted at 226 is connected to member 220 by a pin 228 and slot 230 to provide a slip connection therebetween. One end of arm 210 is provided with a cam surface 236 which engages a roller 238 carried by plate 224 so that rotation of arm 210 in a clockwise direction the plate 224 will be rotated in a counterclockwise direction to open the valve 58.

Any suitable linkage and foot accelerator pedal (not shown) may be used to rotate the butterfly valve, the arm 210 and plate 224.

Assuming that the needle valve 52 and the set screw are adjusted properly for the idling of valve 52 and the idling position of the butterfly valve 40 the operation of the system is as follows. Fuel from a fuel reservoir 250 is delivered through a conduit 252 by a fuel pump 254 and then through a conduit 256 to the fuel inlet 48. The pump 254 may be connected to and operated by an engine 260 in the usual manner. As shown in FIGURE 2 the valves 52 and 54 are in idle position and the valves 56 and 58 in closed position by action of springs 150 and 196, respectively. When the engine 260 is started and the shaft 200 having been rotated the butterfly valve 40 opens and the variable needle valve 54 is lowered to allow more fuel to pass thereby. As soon as the engine begins operation a vacuum is created in the intake manifold 270 of the engine. The intake manifold is connected to the outlet 42 of the carburetor barrel 12 by conduit 276 and is connected to a vacuum passage 280 in housing 11 by conduit 284. The vacuum passage 280 is best shown in FIGURE 7 where it is shown extending upwardly where it joins a horizontal vacuum passage 286 which leads to cavity 146 wherein the valve portion 140 of the compensating valve 56 is located and the cavity 146 is in open communication with cavity 190 by passage 287 where the valve portion 172 of shut-off valve is located. Thus a vacuum is produced in cavities 146 and 172 when the engine starts. This retains the compensating valve 56 in closed position as shown in FIGURE 2 against the action of spring 160 and permits discharge valve 58 to move downwardly to open position against the action of spring 196. This vacuum will hold the valve 58 in open position. As the butterfly valve 40 is moved toward open position, the arm 210 engages roller 238 to cause plate 224 to rotate in a counterclockwise direction to move the member 220 downwardly to open the valve 58 and the vacuum holds it open. Thus the valves 54 and 58 operate in unison with the butterfly valve 40. As the engine 260 starts running and the valve 58 is open the fuel will flow through the fuel inlet 48, vertical passage 74, around needle valve 52 into vertical passage 76, horizontal passage 80, bore 176, passage 290, horizontal passage 294, horizontal bore 296 in nozzle support 299, longitudinal bore 298 in nozzle support into inlet 22 of nozzle 18 and into vertical passage 28 in nozzle 18 and then into a hollow cone 300 which has a small opening 304 to discharge the mixture into the carburetor barrel 12 above the butterfly valve 40. As this takes place gaseous fluid is delivered to the carburetor from the engine exhaust manifold 306 through conduit 308 into inlet 24 of nozzle 18. This gaseous fluid passes to the concave surface 30 of insert 29 where it assumes a swirling motion and passes downwardly around the nozzle portion which forms the passage 28 where it mixes with the fuel leaving the passage 28 to mix therewith upon entering the hollow cone 300 and then out of outlet 304 in proper mixed form. The amount of fluid delivered by the exhaust manifold increases with the speed of the engine. Atmospheric air may be used. As the engine speeds up the vacuum rating is reduced in cavity 146 and the action of spring 160 moves the part 114 of valve 56 upwardly until a predetermined vacuum is present in cavity 146 when the head portion 138 engages push rod 120 and upon further reduction of vacuum rating in cavity 146 the head portion pushes the rod 120 upwardly against the action of spring 150 to open the compensating valve 56 to allow fuel to flow from vertical passage 74 into cavity 100, horizontal passage 310 and around valve proper 110 of valve 56, passage 154 and into passage 80 and then into the carburetor nozzle 18 along with the fuel which passes around the needle valve proper 75 and into the nozzle 18. Thus the control of fuel by valves 54 and 56 and the flow of gaseous fluid from the exhaust manifold 306 provides a proper mixture for all conditions of operation and starting without the use of a choke valve. Under certain conditions of operation the carburetor requires more fuel than the amount delivered around the needle valve 54 and this is accomplished by the compensating valve 56. When the engine stops running the vacuum ceases and the needle valve 54 is returned to the position shown in FIGURE 2, the valve 56 will move to open position by the action of spring 160 against the action of spring 150 but it will close passage 154 when valve proper 110 engages housing 46 on its movement upward. At this time the valve 58 will be moved to closed position by the action of spring 196 as shown in FIG. 2.

The insert 148 is provided with an annular groove 320 and passage 324 so that there is open communication with passage 287 regardless of the position insert 148 when placed in housing portion 46. The insert 192 is provided with an annular groove 328 and passage 330 so that there is open communication with passage 287 regardless of the position insert 192 is placed in housing portion 46. The nozzle 18 is provided wiht an annular groove 336 so that it will provide open communication with passage 296 and passage 294 at all times.

While one exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

We claim:
1. For use in combination with an internal combustion engine having a throttle control, an intake manifold, an exhaust manifold and a fuel supply; a carburetor comprising a housing having a main passage therethrough extending from an air intake to an outlet adapted to be connected to said intake manifold, a fuel inlet adapted to be connected to said fuel supply, fuel nozzle means in said main passage between said intake and said outlet for discharging fuel from said fuel supply into said passage for mixture with air from said air intake, butterfly valve means in said outlet responsive to said throttle control for controlling the flow of gaseous fuel mixtures from said outlet to said intake manifold, passage means for conducting fuel from said fuel inlet to said fuel nozzle, first metering valve means in said passage means for regulating the flow of fuel therethrough in accordance with the position with said butterfly valve means, second valve means in said passage means for increasing the flow of fuel therethrough in response to a reduction of vacuum in said intake manifold, normally closed shutoff valve means in said passage movable to an open position in response to a reduction of vacuum in said intake manifold and third passage means for connecting said nozzle to said exhaust manifold to conduct gases from said exhaust manifold into said fuel nozzle for mixture with fuel passing therethrough.

2. The invention defined in claim 1 wherein said passage means includes an inlet section connected to said fuel inlet and an outlet section connected to said fuel nozzle, first, second and third branch passages in parallel with each other, each connecting said inlet section to said outlet section said first valve means being located in said first branch passage to control the flow of fuel therethrough, said second valve means being located in said second branch passage to control the flow of fuel therethrough, said shutoff valve means being located in said outlet section and an adjustable needle valve in said third branch passage.

3. The invention defined in claim 1 wherein said fuel nozzle has a first inlet for fuel and a second inlet for exhaust gases from said exhaust manifold, means in said nozzle defining a generally conical mixing chamber connected to said first and said second inlets, and having a discharge outlet connected to said conical chamber.

References Cited
UNITED STATES PATENTS

| | | | |
|---|---|---|---|
| 1,610,825 | 12/1926 | Thomas. | |
| 1,970,601 | 8/1934 | Funderburk | 123—119 |
| 2,087,116 | 7/1937 | Prentiss. | |
| 2,114,548 | 4/1938 | Stadlman. | |
| 2,223,381 | 12/1940 | Mock | 123—119 |
| 2,297,109 | 9/1942 | Moseley | 261—41.4 |
| 2,443,527 | 6/1948 | Wirth et al. | 123—119 |
| 2,445,097 | 7/1948 | Wirth et al. | 123—119 XR |
| 2,447,263 | 8/1948 | Mock | 123—119 |
| 3,013,779 | 12/1961 | Kalert et al. | 261—51 XR |
| 3,350,073 | 10/1967 | Hill | 261—69.1 XR |

LAURENCE M. GOODRIDGE, Primary Examiner

U.S. Cl. X.R.

123—122, 130